(12) United States Patent
Guo et al.

(10) Patent No.: US 7,122,797 B2
(45) Date of Patent: Oct. 17, 2006

(54) METHOD FOR MAKING AN INFRARED DETECTOR AND INFRARED DETECTOR

(75) Inventors: Shuwen Guo, Lakeville, MN (US); Thomas Wiegele, Apple Valley, MN (US)

(73) Assignee: Sensors Unlimited, Inc., Princeton, NJ (US)

( * ) Notice: Subject to any disclaimer, the term of this patent is extended or adjusted under 35 U.S.C. 154(b) by 280 days.

(21) Appl. No.: 10/658,042

(22) Filed: Sep. 9, 2003

(65) Prior Publication Data
US 2004/0113076 A1 Jun. 17, 2004

Related U.S. Application Data

(60) Provisional application No. 60/421,816, filed on Oct. 28, 2002, provisional application No. 60/409,131, filed on Sep. 9, 2002.

(51) Int. Cl.
*G01J 5/00* (2006.01)
(52) U.S. Cl. .................................... 250/338.1
(58) Field of Classification Search ................ 136/224, 136/225, 226, 227; 250/338.1
See application file for complete search history.

(56) References Cited

U.S. PATENT DOCUMENTS

| 4,959,546 | A |   | 9/1990  | Bly |
| 5,056,929 | A |   | 10/1991 | Watanabe et al. |
| 5,087,312 | A | * | 2/1992  | Gerber et al. ............... 136/225 |
| 5,100,479 | A |   | 3/1992  | Wise et al. |
| 5,879,572 | A | * | 3/1999  | Folsom et al. ............... 216/49 |
| 6,046,398 | A |   | 4/2000  | Foote et al. |
| 6,066,574 | A |   | 5/2000  | You et al. |
| 6,080,987 | A |   | 6/2000  | Belcher et al. |
| 6,305,840 | B1 |   | 10/2001 | Kim et al. |
| 6,348,650 | B1 | * | 2/2002  | Endo et al. ................. 136/201 |
| 6,380,605 | B1 | * | 4/2002  | Verhaegen .................. 257/467 |
| 6,444,487 | B1 |   | 9/2002  | Boggs et al. |
| 6,607,935 | B1 |   | 8/2003  | Kwon |
| 2002/0069909 | A1 |   | 6/2002  | Kubo |

FOREIGN PATENT DOCUMENTS

EP          1072875          1/2001

OTHER PUBLICATIONS

Hsieh, Ming-Chin et al., "Design and Fabrication of a Novel Crystal SiGeC Far Infrared Sensor with Wavelength 8-14 Micrometer," *IEEE Sensors Journal*, vol. 2, No. 4, pp. 360-365 (Aug. 2002).
Taniguchi, Y. et al., "Pyroelectric Infrared Sensor Using PZT Thin Plate on Diaphragm as Sensitive Elements," *Electronics and Communications in Japan*, Part 2, vol. 79, No. 7, pp. 86-96 (Jan. 1996).
Sánchez, S. et al., "A High $T_c$ Superconductor Bolometer on a Silicon Nitride Membrane," *Journal of Microelectrochemical Systems*, vol. 7, No. 1, pp. 62-67 (Mar. 1998).

(Continued)

Primary Examiner—Constantine Hannaher
(74) Attorney, Agent, or Firm—Thompson Hine LLP

(57) ABSTRACT

A detector including a base having a recess formed therein and a diaphragm generally extending across the recess. The detector further includes an infrared sensitive component or a piezoelectric or piezoresistive element located on, above or supported by the diaphragm. The diaphragm includes a material which is generally resistant to liquid chemical etchants and which has a thermal conductivity of less than about 0.005 $Wcm^{-1}K^{-1}$.

61 Claims, 11 Drawing Sheets

OTHER PUBLICATIONS

Il Myun Choi et al., "A Silicon-Thermopile-Based Infrared Sensing Array for Use in Automated Manufacturing," *IEEE Transactions on Electron Devices*, vol. ED-33, No. 1, pp. 72-79 (Jan. 1986).

Dannenberg, R. et al., "Electrical and Optical Properties of $Mn_{1.56}Co_{0.96}Ni_{0.48}O_4$," *SPIE*, vol. 3379, pp. 158-165 (Apr. 1998).

Baliga, S. et al., "Sputtered film thermistor IR detectors," *SPIE*, vol. 2225, pp. 72-78 (date unknown) Applicants admit the status of this publication as prior art for the limited purpose of examination of this application, but otherwise reserve the right to challenge the status of this publication as prior art. [1994].

Lahiji, G.R. et al., "A Batch-Fabricated Silicon Thermopile Infrared Detector," *IEEE Transactions on Electron Devices*, vol. ED-29, No. 1, pp. 14-22 (Jan. 1982).

Völklein, F. et al., "High-sensitivity radiation thermopiles made of Bi-Sb-Te Films," *Sensors and Actuators*, A, 29, pp. 87-91 (1991).

Mirmira, S.R. et al., "Review of the Thermal Conductivity of Thin Films" *Journal of Thermophysics and Heat Transfer*, vol. 12, No. 2, pp. 121-131 (Jun. 1998).

Shackelford, J.F. et al., Table 77. Thermodynamic Coefficients for Oxides, p. 281, *Materials Science and Engineering Handbook*, Third Edition, CRC Press (2000).

Lenggenhager, R. et al., "Thermoelectric infrared sensors in CMOS technology," *Sensors and Actuators*, A, 37-38, pp. 216-220 (1993).

Muller, M. et al., "A Thermoelectric Infrared Radiation Sensor with Monolithically Integrated Amplifier Stage and Temperature Sensor," *Transducers '95*, pp. 640-643.

Abowitz, G. et al., "The Electrical Properties of Bi:Sb:Se:Te Films," *Electrical Technology*, pp. 426-430 (Jul. 1996).

Tezcan, D.S. et al., "A Low Cost Uncooled Infrared Microbolometer Focal Plane Array Using the CMOS N-Well Layer," *IEEE*, pp. 566-569 (2001).

Tezcan, D.S. et al., "An Uncooled Microbolometer Infrared Focal Plane Array in Standard CMOS," *SPIE*, vol. 4288, pp. 112-121 (2001).

Eminoglu, S. et al., "A CMOS N-Well Microbolometer FPA with Temperature Coefficient Enhancement Circuitry," *SPIE*, vol. 4369, pp. 240-247 (2001).

"CYCLOTENE—Advanced Electronics Resing Processing Procedures for Dry-Etch CYCLOTENE Advanced Electronics Resins (Dry-Etch BCB)," pp. 1-8, by the Dow Chemical Company (1997).

Web page relating to "CYCLOTENE Dry-Etch Resins," by The Dow Chemical Company (date of first publication unknown) Applicants admit the status of this publication as prior art for the limited purpose of examination of the application, but otherwise reserve the right to challenge the status of this publication as prior art.

Web page relating to "CYCLOTENE Planarization," by The Dow Chemical Company (date of first publication unknown) Applicants admit the status of this publication as prior art for the limited purpose of examination of the application, but otherwise reserve the right to challenge the status of this publication as prior art.

Web page relating to "CYCLOTENE Plasma Etching," by The Dow Chemical Company (date of first publication unknown) Applicants admit the status of this publication as prior art for the limited purpose of examination of the application, but otherwise reserve the right to challenge the status of this publication as prior art.

* cited by examiner

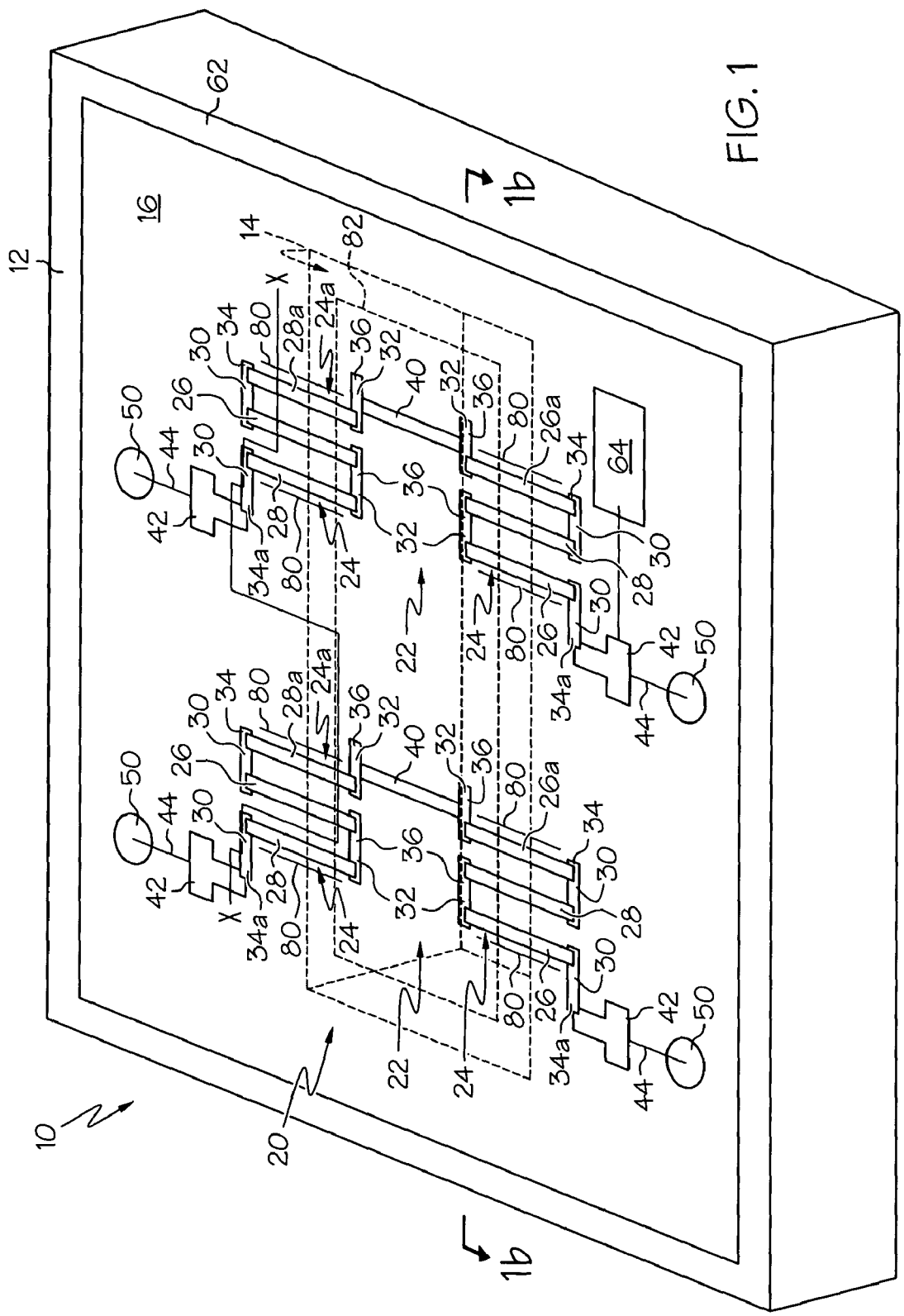

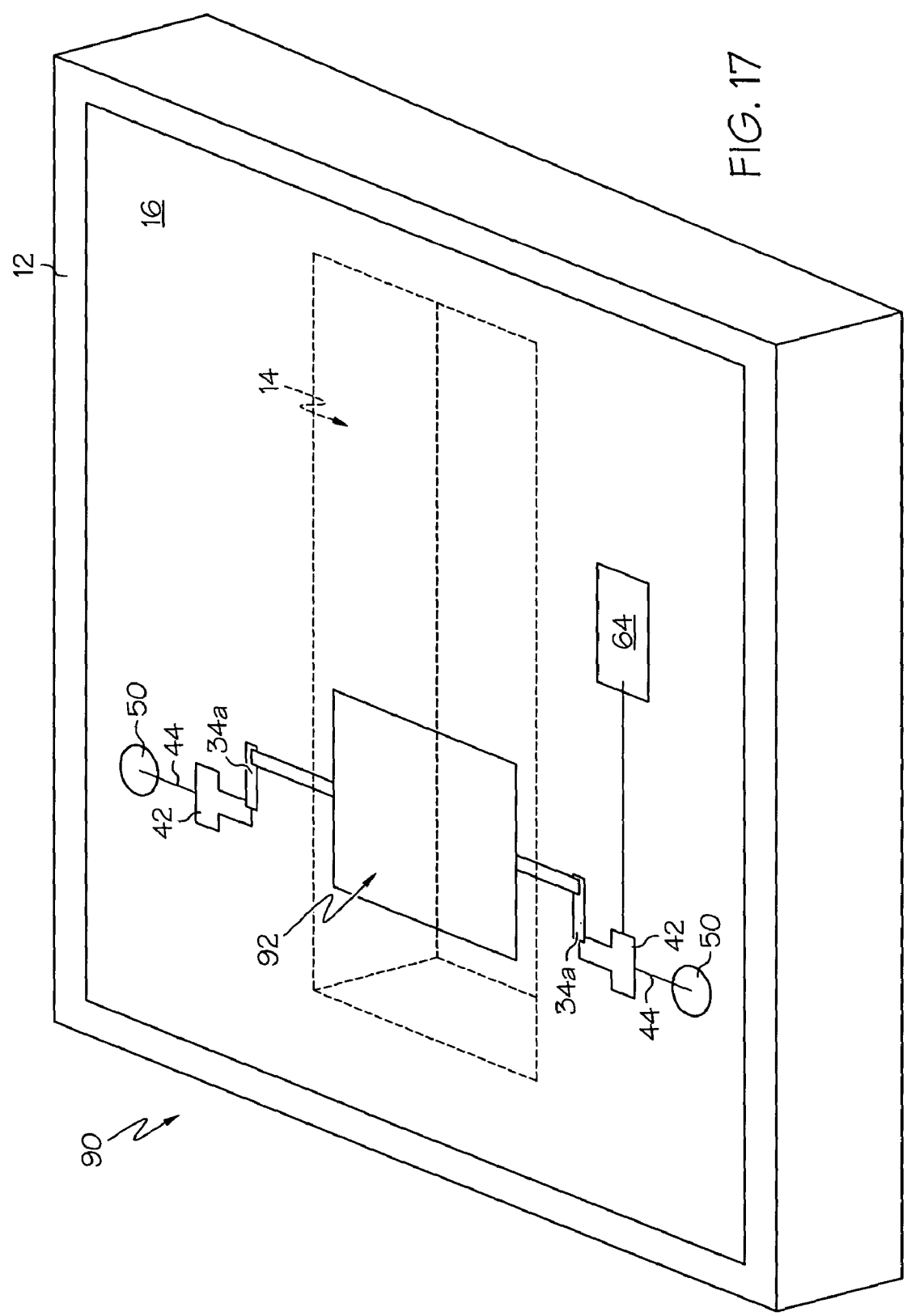

METHOD FOR MAKING AN INFRARED DETECTOR AND INFRARED DETECTOR

This application claims priority to U.S. Provisional App. Ser. No. 60/409,131, filed Sep. 9, 2002, and U.S. Provisional App. Ser. No. 60/421,816, filed Oct. 28, 2002. The contents of both of these applications are hereby incorporated by reference.

FIELD OF THE INVENTION

The present invention is directed to infrared detectors, and more particularly, to infrared detectors having infrared sensitive elements located on a diaphragm.

BACKGROUND

Infrared detectors may include infrared ("IR") sensitive components located on a suspended diaphragm. The diaphragm may be relatively thin to reduce the thermal conductance of the diaphragm and thereby improve the sensitivity of the detector. The diaphragms of existing infrared detector may include a layer of silicon nitride. However, diaphragms of such construction may be fragile which may reduce manufacturing yields and limit the ability to further process the detector after formation of the diaphragm. Furthermore, due to its high thermal conductivity the silicon nitride layer may provide significant thermal loss.

In order to minimize breakage the fabrication process may be arranged such that the diaphragm is formed as the final step. However, this procedure limits the flexibility of the manufacturing process and of course limits the ability to add additional components after the formation of the diaphragm. Further, even when the diaphragm is formed as the last step of the manufacturing process, the diaphragm may sufficiently fragile to be prone to breakage during packaging or handling of the detector.

Accordingly, there is a need for a infrared detector having a diaphragm which has a relatively low thermal conductance, is relatively robust, and can withstand a variety of chemical etchants.

SUMMARY

The present invention is, in one embodiment, an infrared detector having a diaphragm which has a relatively low thermal conductance, is relatively robust, and can withstand a variety of chemical etchants.

In one embodiment, the invention is an infrared detector having a base supporting a suspended diaphragm with an IR detecting component located on the diaphragm. The diaphragm has a low thermal conductivity, is robust and easy to process, is chemically resistant to a wide variety of etching agents, and is easily patterned. In one embodiment, the diaphragm is benzocyclobutene ("BCB"), parylene, polyimid, or other materials.

In one embodiment, the infrared detecting component includes a plurality of thermocouples connected in series. The hot junction of the thermocouples is located on suspended portions of the diaphragm, and the cold junctions of the thermocouples is located on the non-suspended portions of the diaphragm located on, above, or supported by the base.

In one embodiment, the invention is a detector including a base having a recess formed therein and a diaphragm generally extending across the recess. The detector further includes an infrared sensitive component or a piezoelectric or piezoresistive element located on, above or supported by the diaphragm. The diaphragm includes a material which is generally resistant to liquid chemical etchants and which has a thermal conductivity of less than about 0.005 $Wcm^{-1}K^{-1}$.

In another embodiment, the invention is a detector including a base having a recess formed therein and a diaphragm generally extending across the recess. The detector further includes an infrared sensitive component or a piezoelectric or piezoresistive element located on, above or supported by the diaphragm. The diaphragm includes a material which 1) is generally resistant to liquid chemical etchants and which has a thermal conductivity of less than about 0.005 $Wcm^{-1}K^{-1}$, or 2) which has a Young's modulus of less than about 10 GPa, or 3) which is depositable in liquid form and curable at a temperature of less than about 450° C., or 4) which is photodefinable or photopatternable.

In another embodiment the invention is a method for utilizing a detector including the steps of providing a detector including a base having a recess formed therein, a diaphragm generally extending across the recess, and an infrared sensitive component or a piezoelectric or piezoresistive element located on, above or supported by the diaphragm. The diaphragm includes a material which is generally resistant to liquid chemical etchants and which has a thermal conductivity of less than about 0.005 $Wcm^{-1}K^{-1}$. The method further includes the steps of connecting one of the infrared sensitive component or piezoelectric or piezoresistive elements to a monitoring device and exposing the detector to infrared radiation or ultrasonic waves such that the infrared sensitive component or piezoelectric or piezoresistive elements, responsive to the infrared radiation or the ultrasonic waves, generates an electrical signal which is detected by the monitoring device.

In another embodiment the invention is a method for forming a detector including the steps of providing a base and forming or locating an infrared sensitive component or piezoelectric or piezoresistive element on the base. The method further includes the steps of forming or locating a diaphragm on or over the infrared sensitive component or piezoelectric or piezoresistive element and removing at least part of the base to form a recess such that the recess is located below at least part of the infrared sensitive component or piezoelectric or piezoresistive element.

Other objects and advantages of the present invention will be apparent from the following description and the accompanying drawings.

BRIEF DESCRIPTION OF THE DRAWINGS

FIG. 1 is a top perspective view of one embodiment of the detector of the present invention;

FIG. 17 is a top perspective view of another embodiment of the detector of the present invention.

DETAILED DESCRIPTION

Figure 1B:
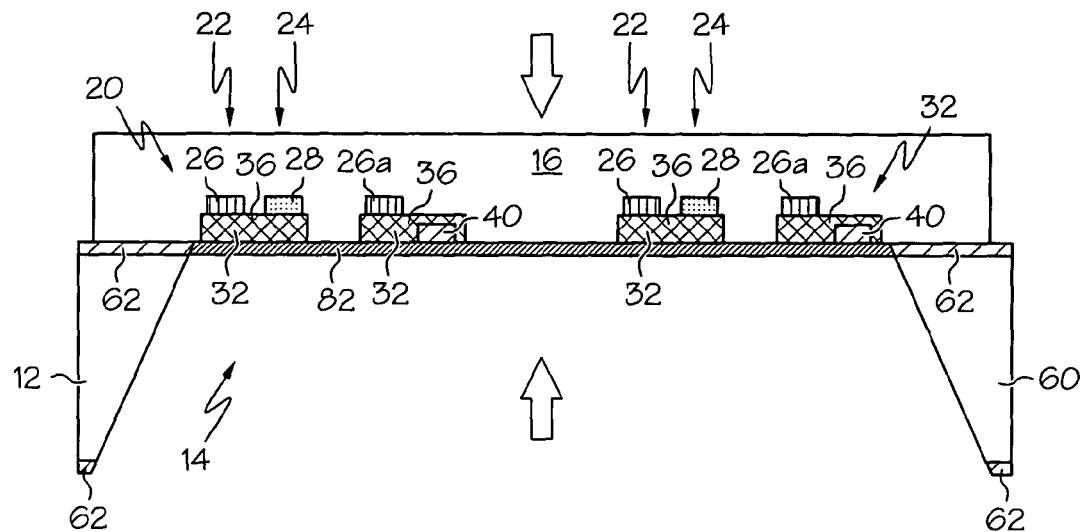
FIG. 1b is a side cross section taken along line 1b of FIG. 1.

FIGS. 1 and 1b illustrate one embodiment of the infrared detector or sensor 10 of the present invention. The detector includes a base 12 which may be generally square in top view and has a central recess or opening 14. The base 12 can also have a variety of other shapes besides square in top view, including but not limited to generally rectangular or circular in top view. The base 12 can be made from a wide variety of materials, and is made of materials and/or have sufficient thickness to be generally rigid. The base 12 has a relatively high thermal conductance. The detector 10 includes a diaphragm, membrane or thin film 16 located on the base 12 and generally extending across or covering the central opening 14. The diaphragm 16 includes an infrared sensitive component 20 or components located thereon.

Although the various materials for the diaphragm 16 will be described in detail below, in one embodiment the diaphragm 16 is or includes benzocyclobutene ("BCB") which is sold by The Dow Chemical Company of Midland, Mich. under the mark CYCLOTENE®, or may be made of parylene, polyimid, or other acceptable materials, or any combination of these or other materials. The materials used as a diaphragm 16 are chemically resistant to a wide variety of etching processes, including silicon etching processes. The materials used as a diaphragm 16 are photopatternable or photodefinable. In other words, the material used as a diaphragm 16 are able to be patterned using common techniques such as, but not limited to, the use of a mask in combination with ultraviolet or other electromagnetic radiation such that portions of the diaphragm harden/cure or soften/become removable upon exposure to the ultraviolet or other electromagnetic radiation.

The diaphragm 16 has a relatively low thermal conductivity (i.e., in one case less than about 0.01 or less than about 0.005 $Wcm^{-1}K^{-1}$) and is desired to be relatively thin, which decreases thermal conductivity. Thus the diaphragm 16 is desired to be made of a relatively robust material so that the diaphragm 16 can be relatively thin but relatively strong to resist breaking. Thus the diaphragm material 16 may have a Young's modulus of less than about 10 GPa. The diaphragm material 16 may also be made of a material which can be deposited in liquid form and cured at a relatively low temperature, such as, for example, less than about 450° C. In one embodiment, the diaphragm 16 is generally square in top view, having a side length of about 1000 microns. The diaphragm 16 may also be other shapes besides square, such as rectangular (having dimension of about 2750 microns by about 1000 microns), circular, etc.

The infrared sensitive component 20 includes at least one property that varies when the infrared sensitive component 20 is exposed to infrared radiation. For example, the infrared sensitive component 20 includes a plurality of thermopiles 22, each of which includes a plurality of thermocouples 24. FIG. 1 illustrates a pair of thermopiles 22, each having three thermocouples 24. Each thermocouple 24 includes a pair of generally parallel and spaced-apart legs 26, 28 which are formed in a generally serpentine shape. Alternating ones of the legs 26 are formed of a first material, and the remaining (alternating) ones of the legs 28 are formed of a second material.

The first 26 and second 28 legs or materials have opposite Seebeck coefficients. For example, leg 26 of the first material develops a positive voltage across its endpoints when exposed to a certain temperature differential, and leg 28 of the second material develops a negative voltage across its endpoints when exposed to the same temperature differential. A leg 26 of the first material which is coupled to a leg 28 of the second material thereby form a thermocouple 24.

The legs 26, 28 are electrically connected in series and are at least partially located on the diaphragm 16 such that each of the outer endpoints of each leg 26, 28 (i.e. the cold junctions 30) are located on or above the base 12 and the inner endpoints of the legs 26, 28 (i.e. the hot junction 32) are located on the suspended portions of the diaphragm 16. In this manner the inner endpoints of the legs 26, 28 and the hot junction 32 are located above the recess 14 and are spaced away from the base 12 to thermally isolate the hot junction 32 of each thermocouple 24 from the associated cold junction 30. Because the cold junction 30 of each thermocouple 24 are located on, adjacent to, or above the base 12, which can be considered to be a heat sink, the hot 32 and cold 30 junctions are generally thermally separated or isolated.

Each thermopile 22 includes a plurality of outer 34 and inner 36 connection pads. The inner end of each leg 26, 28 of each thermocouple 24 that is located on, or adjacent to, or forming part of the hot junction 32 are electrically coupled to any adjacent legs 26, 28 by an inner connection pad 36. Similarly, the end of each leg 26, 28 of each thermocouple 24 that is located on, or adjacent to, or forming a part of the cold junction 30 are electrically coupled to any adjacent legs 26, 28 by an outer connection pad 34. Thus, each connection pad 34, 36 is located at or form part of a hot 32 or cold 30 junction of thermocouple 24.

Each thermopile 22 includes a transverse connection line 40 which extends between the hot junction 32 of an end leg 26a of a first material and the hot junction 32 of an end leg 28a of the second material. In this manner, the end legs 26a, 26b form an end thermocouple 24a.

Each thermopile 22 includes a pair of end connection pads 34a which are electrically coupled to respective output pads or wire bond pads 42. The output pads 42 are able to be directly or indirectly coupled to an output or external device. Thus, each output pad 42 is able to accept wire bonds 44 which are in turn coupled to an output connector or prong 50.

Each of the inner 36 and outer 34 connection pads, transverse connection lines 40, end connection pads 36a, 34a and output pads 42 may be made of the same material. However, in one embodiment the inner 36 and outer 34 connection pads and end connection pads 36a, 34a are made of NiCr to ensure good adhesion to the diaphragm 16, and the transverse connection lines 40 and output pads 42 are made of gold to ensure good electrical connections such as via the wire bonds 44.

An instrument, computer, controller, processor or other external device can be coupled to the output pads 42 to measure the potential difference across each thermocouple 24, and thereby each thermopile 22 (or the detector 10 as a whole). The external device may not necessarily be directly coupled to the output pads 42, and may instead be coupled to the prongs or other output connectors 50).

FIGS. 1 and 1b illustrate a pair of thermopiles 22, each having three thermocouples 24. However, it should be understood that the number and arrangement of thermopiles 22 and thermocouples 24 can be varied to accommodate the desired operating characteristics of the detector 10. For example, each thermopile 22 may have anywhere from one to fifty or more thermocouples 24, and the detector 10 may have anywhere from one to fifty or more thermopiles 22 and in one embodiment the detector 10 includes sixteen thermopiles 22, each having eleven thermocouples 24.

Figure 1C:
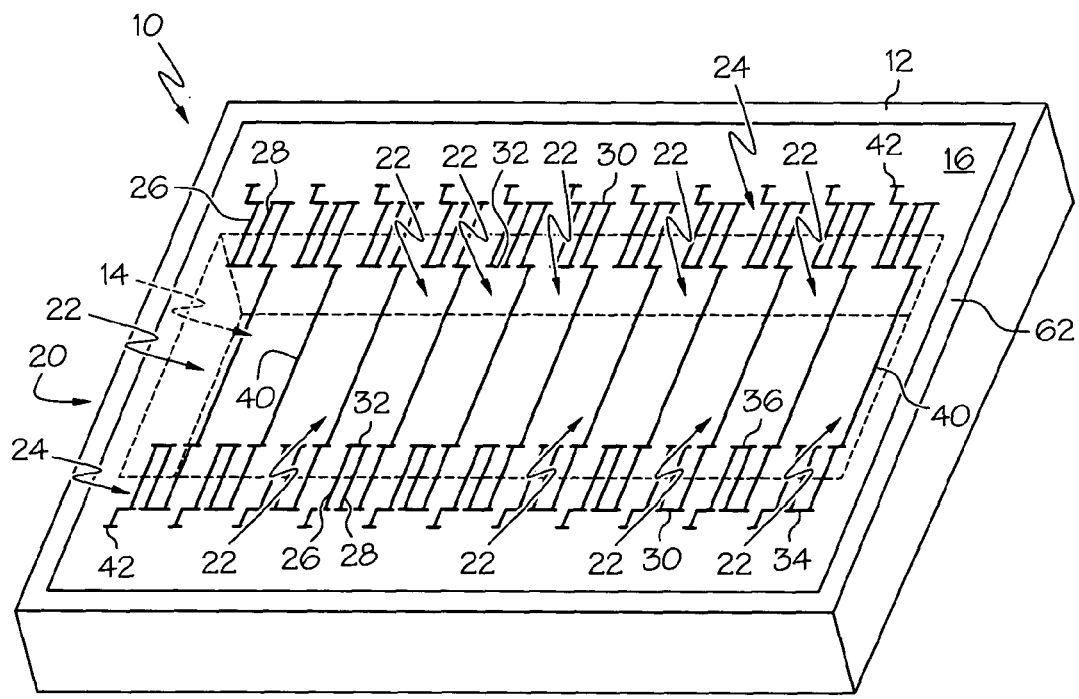
FIG. 1c is a top perspective view of another embodiment of the detector of the present invention.
Figure 2:
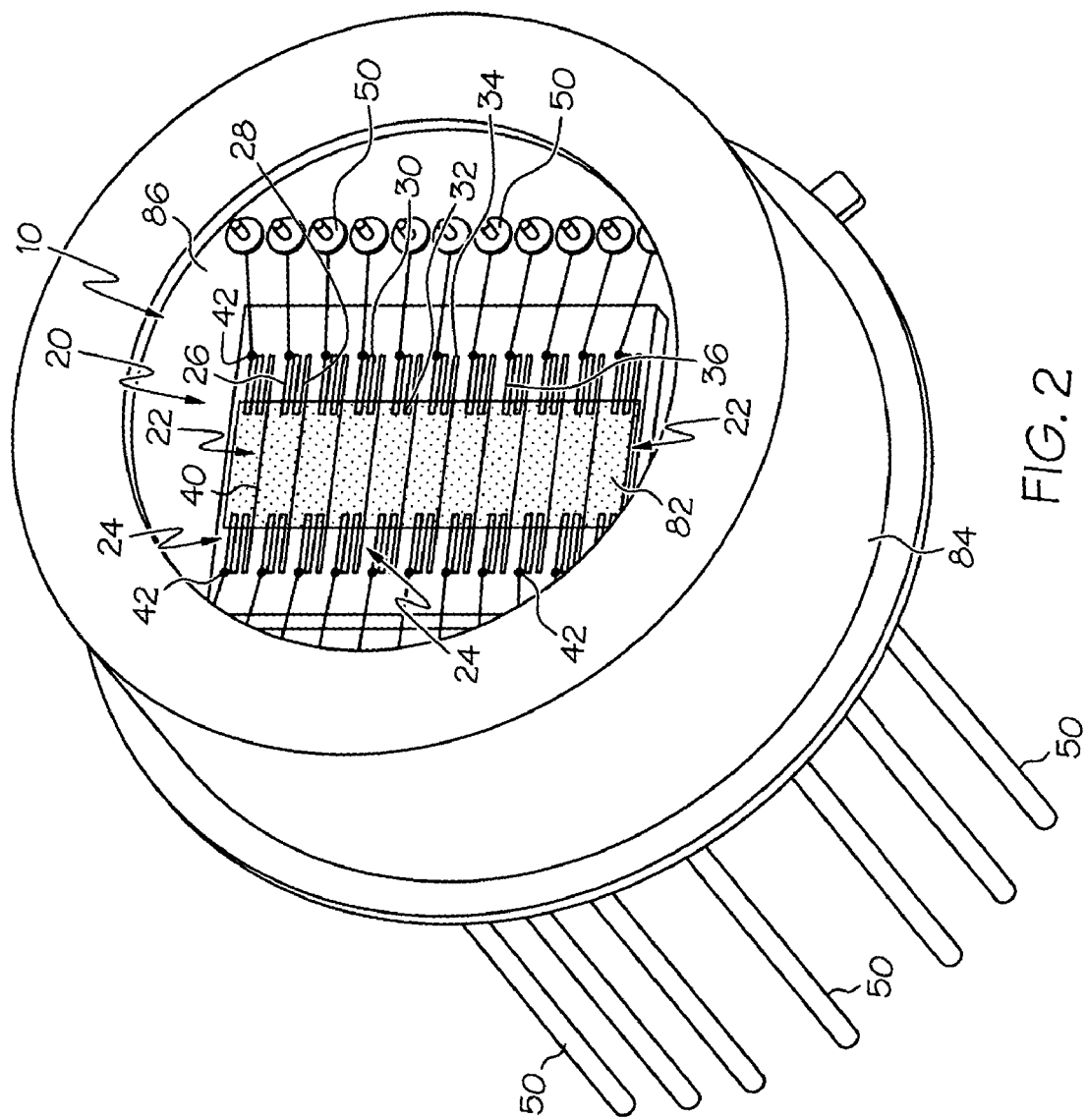
FIG. 2 is a top perspective view of a package including the detector of FIG. 1c packaged therein.
Figure 3:
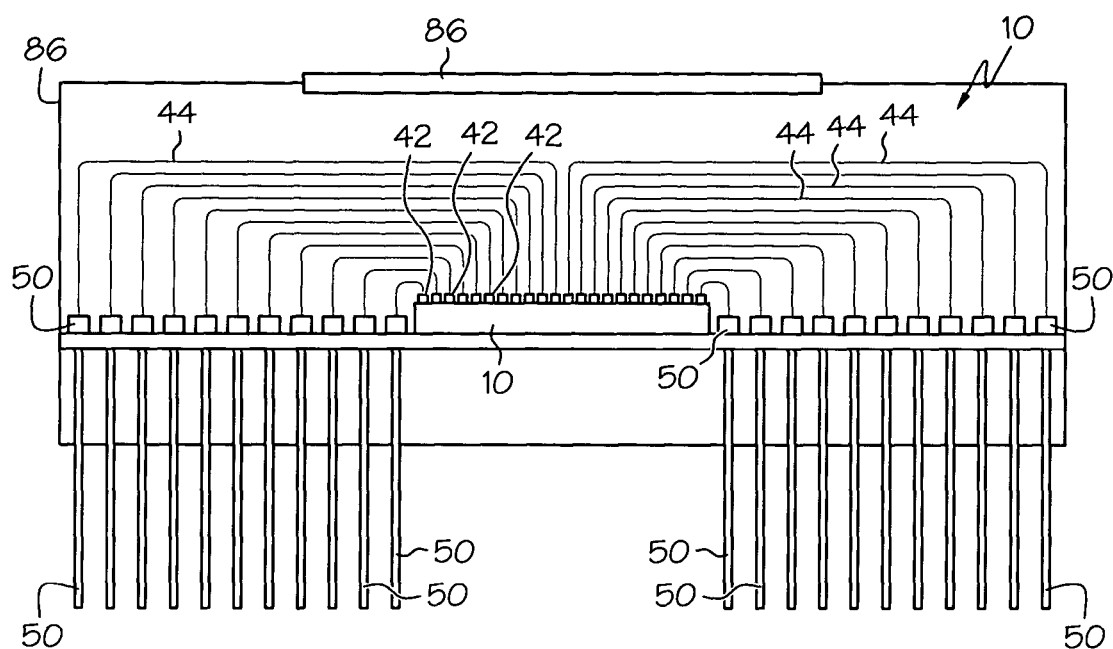
FIG. 3 is a schematic cross section of the detector and package of FIG. 2.

FIGS. 1c, 2 and 3 illustrate a detector 10 or detector array 10 having eleven thermopiles 22. Thus, the detector of FIG. 3 has twenty-two output pads 42 (two output pads 42 for each of the thermopiles 22). Each output pad 42 is coupled to the upper end of an output connector 50 via a wire bond 44, and the output connector 50 can be coupled to an external device. The external device can then utilize the output of the thermopiles 22 to determine the amount of IR to which the detector 10 is exposed. Thus the output connectors 50 are electrically coupled to the output pads 42 to provide a convenient mechanism for coupling the external device to the thermopiles 22.

As will be discussed in greater detail below, the material of the thermopiles 22 and thermocouples 24 may vary widely to suit the desires of the end user. However, in one embodiment the thermopiles 22/thermocouples 24 includes Bi—Sb—Te—Se alloys or polysilicon.

In operation, an instrument, computer, controller, processor or other external device is coupled to the output pads 42 (i.e. via the output connectors 50). The detector 10 is then placed in the presence of IR radiation, or IR radiation is directed at the detector 10. The IR radiation will then be absorbed by an absorber layer or portion located on the center of the diaphragm 16, thereby causing the temperature of the legs 26, 28, and in particular, the portions of the legs 26, 28 located at or adjacent to the associated hot junction 32, to rise. The cold junction 30 of the legs 26, 28 is located on the base 12, which is thermally conductive and may be considered to act as a heat sink. Thus, a temperature differential will arise between the hot 32 and cold 30 junctions, which will cause a voltage to arise across each of the legs 26, 28, each of the thermocouples 24, and each thermopile 22.

The instrument, computer, controller, processor or other external device then detects the voltage across the thermopile 22 or thermopiles 22 and determine the amount and/or concentration of IR radiation to which the detector 10 is exposed by, for example, referring to empirical and/or theoretical look-up tables and/or by performing other calculations upon the measured voltage. Because the diaphragm 16 may be generally transparent to IR radiation, the detector 10 may be able to detect IR radiation from either side of the diaphragm (as shown schematically by the arrows in FIG. 1b).

One process for forming the detectors 10 of FIGS. 1, 1b, 1c, 2 and 3 is shown in FIGS. 4–16 and discussed below, although it should be understood that different steps may be used in the process, or an entirely different process may be used without departing from the scope of the invention. Thus, the manufacturing steps illustrated herein are only one manner in which a detector 10 may be manufactured, and the order and details of each step described herein may vary or other steps may be used or substituted with the other steps as is well known in the art. A number of detectors 10 may be simultaneously formed on a single wafer or on a number of wafers in a batch manufacturing process. However, for clarity of illustration, FIGS. 4–16 illustrate only a single detector 10 being formed. FIGS. 4, 5, 7, 9, 11 and 13–16 are cross sections of a wafer during the formation or manufacturing process, and FIGS. 6, 8, 10 and 12 are top views. The cross sections of the wafer of FIGS. 4, 5, 7, 9, 11 and 13–16 may be taken along line X—X of FIGS. 1 and 12.

Figure 4:
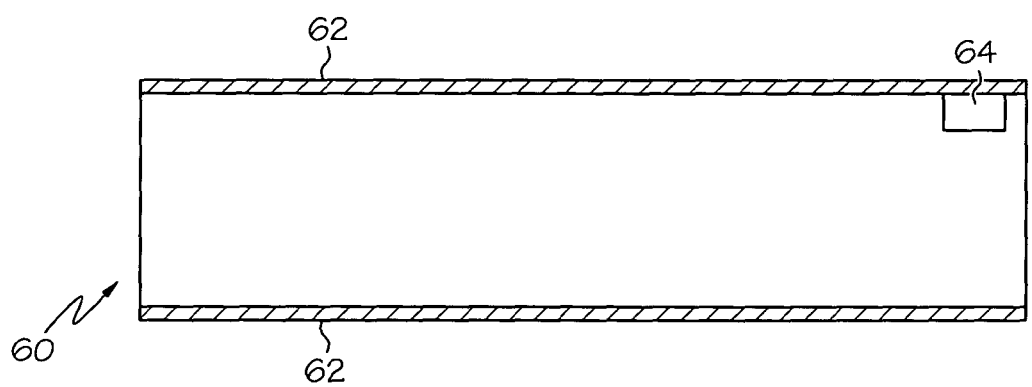
FIGS. 4–16 are a series of side cross section and top views of a portion of a wafer illustrating a method for forming the detector of FIG. 1.

As shown in FIG. 4, the process may begin with a double sided polished wafer 60, such as a single crystal silicon wafer. However, the wafer 60 can also be made from a variety of materials besides single crystal silicon, including but not limited to amorphous silicon, polysilicon, silicon carbide, germanium, polyimid, nitride, sapphire, gallium arsenide, gallium nitride, a combination of materials and any other machinable material. However because the bulk material of the wafer 60 will ultimately form the base 12, the wafer 60 is made of a relatively highly thermally conductive material (i.e., having a preferred thermal conductivity of greater than about 0.1 W/cm-k, or a more preferred thermal conductivity of greater than about 0.5 W/cm-k, or a most preferred thermal conductivity of greater than about 1.0 W/cm-k).

The wafer 60 may have a variety of shapes and thicknesses. In one embodiment, the wafer 60 may have a diameter of about 4 inches, and may have a thickness between about 50 and about 1000 microns, and in one embodiment is about 300 microns thick. When the wafer 60 is silicon, the silicon may have a (100) orientation.

If the wafer 60 does not already have such a layer, an insulating or passivation layer 62 is then located thereon. In one embodiment, the passivation layer 62 is a low pressure chemical vapor deposited ("LPCVD") silicon nitride ($Si_3N_4$) having a thickness of about 1500 Å, (the relative thicknesses of the various layers are not necessarily shown in scale in the accompanying drawings) although a wide variety of other materials and/or other thickness may be used. The passivation layer 62 is located on both the top and bottom surfaces of the wafer 60.

The wafer 60 has electronics 64, which may include circuitry, processors, memory, ASICs, controllers, logic programming, or the like, and may include a plurality of transistors, such as CMOS ("complementary metal on silicon") transistors located thereon. The electronics 64 are formed using standard and well known CMOS or other electronics and/or circuitry manufacturing techniques. The electronics 64 provide signal conditioning, amplification, or other processing circuitry to the finished detector. Although the electronics 64 are illustrating as being relatively small compared to the thermopiles 22, the electronics may be as large or significantly larger than the thermopiles 22.

The wafer 60 shown in FIG. 4, with the passivation layer 62 and electronics 64 located thereon, may be provided by a wafer foundry or manufacturer. Thus, the wafer 60 of FIG. 4 may be ordered from a wafer foundry such that the wafer 60 has the desired materials, thicknesses and properties, and the electronics 64 has the desired characteristics, operating capabilities and the like to accommodate the detector 10 to be manufactured thereon. Because the wafer 60 has the electronics 64 located thereon, the remaining process steps of (i.e. those shown in FIGS. 5–16) are desired to be compatible the electronics 64 so that the electronics 64 are not damaged when forming the various components (i.e. thermopile 22) of the detector 10. A process in which the components of the IR detector 10 are formed on the wafer 60 after the electronics 64 are formed on the wafer 60, as opposed to the opposite order, can provide a faster, cheaper, and more efficient manufacturing process.

Figure 5:
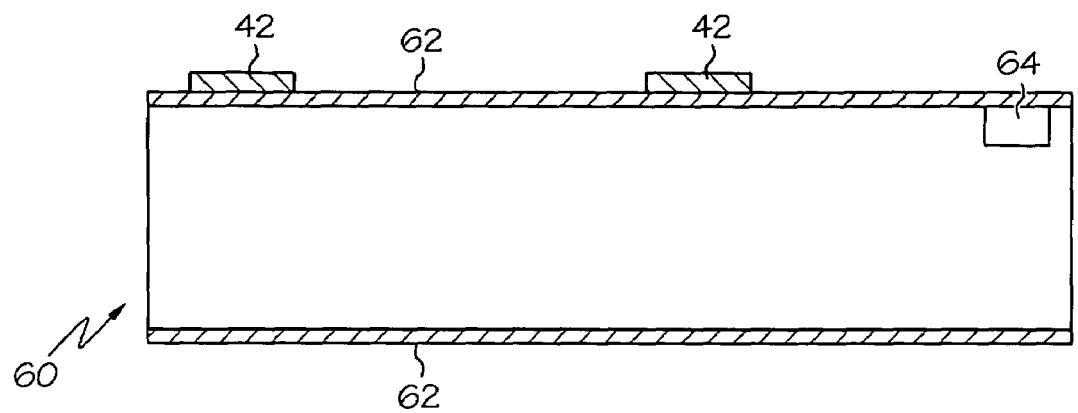
Figure 6:
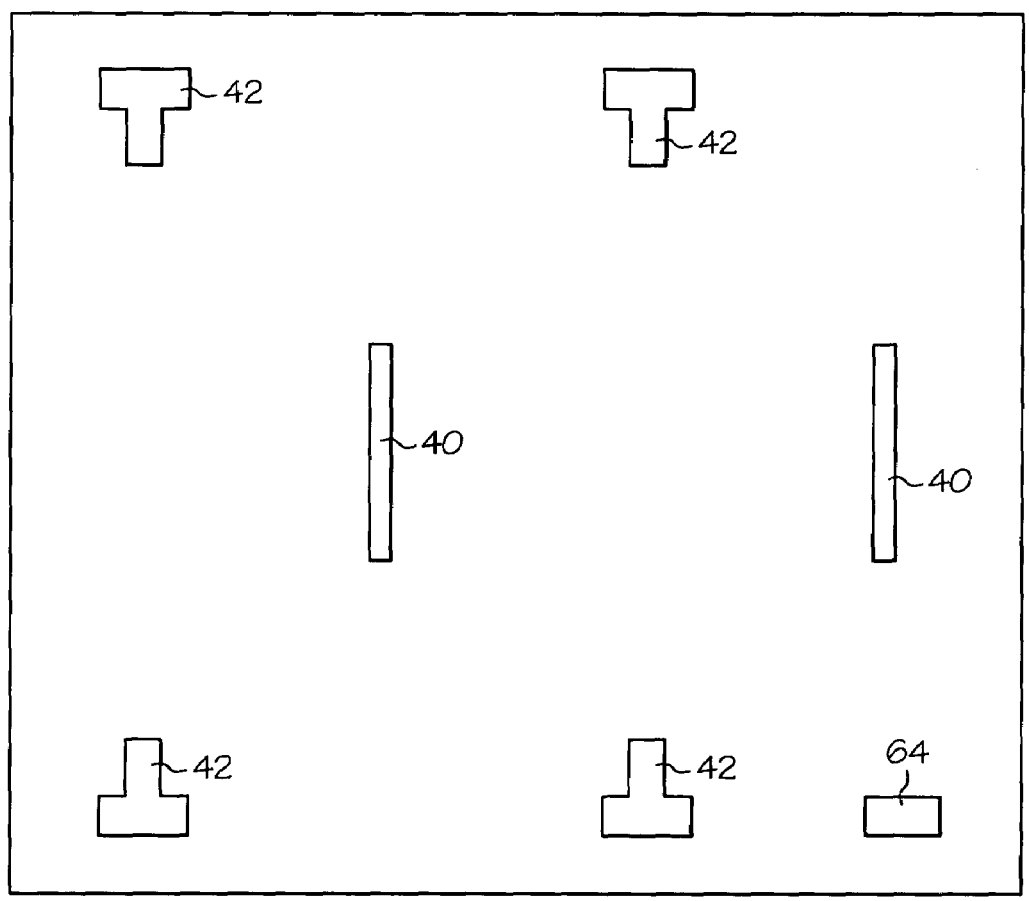

As the next step in the manufacturing process, the bond pads 42 and transverse connection lines 40 are then formed on the wafer 60 (FIGS. 5 and 6). The bond pads 42 are of sufficient size, shape and material to provide a connection to an external device, such as via a wire bond. The transverse connection lines 40 are located to electrically couple the various end legs 26, 28 of the thermocouples 24 located on opposite sides of the diaphragm 16. In one embodiment, each bond pad 42 and transverse connection line 40 may be a 5000 Å thick layer of gold, although any of a wide variety of thickness and types of material may be used, including platinum.

When the bond pads 42 and transverse connection lines 40 are gold, an adhesion layer, such as about 50–200 Å thick titanium (not shown), may be deposited onto the wafer 60 or the passivation layer 62 on the locations where the bond pads 42 and transverse connection lines 40 will be deposited. The bond pads 42 and transverse connection lines 40 are then located on top of the adhesion layer. The bond pads 42, transverse connection lines 40 and adhesion layer may be deposited by an acceptable method such as, for example, sputtering or metal evaporation.

Figure 7:
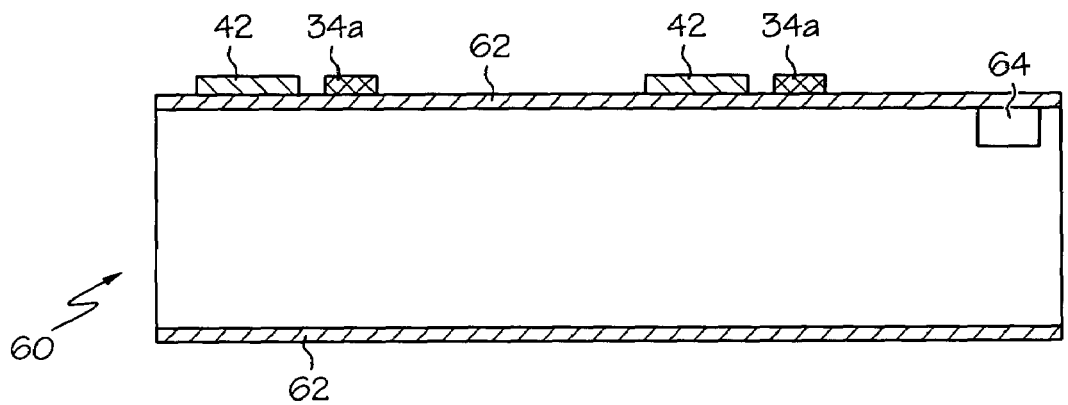
Figure 8:
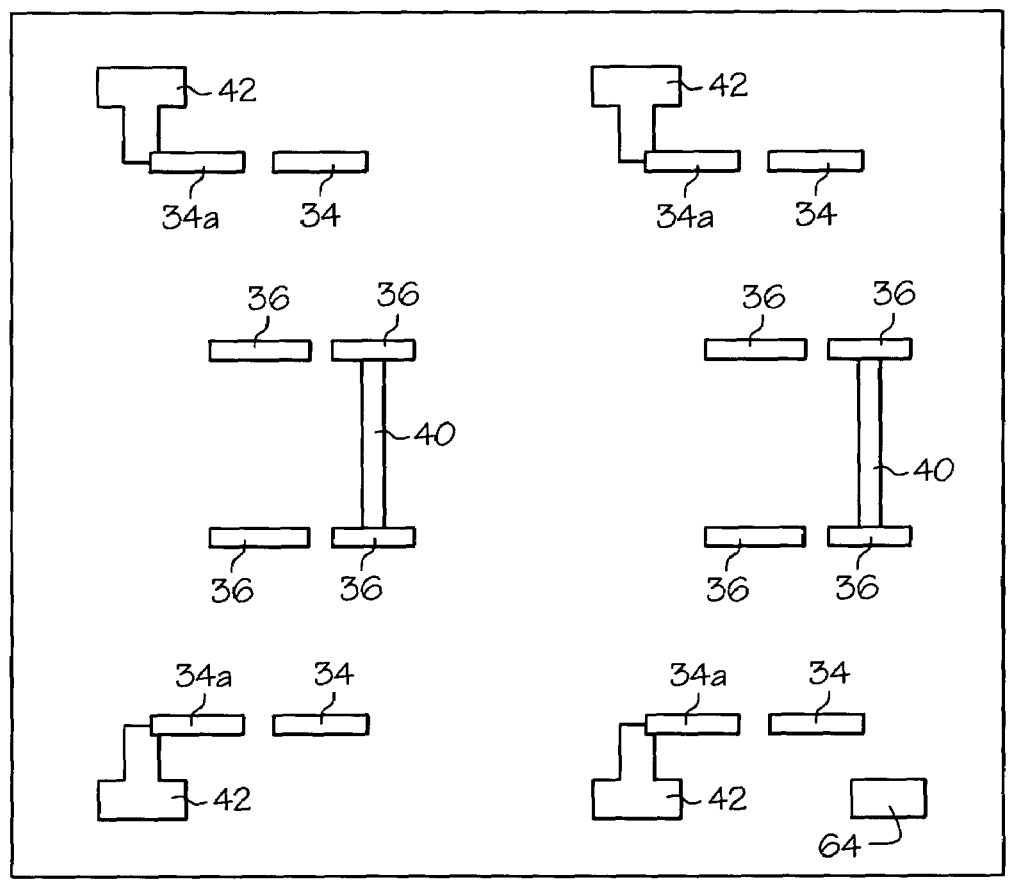

Next, as shown in FIGS. 7 and 8, a plurality of connection pads 34, 34a, 36 are located on the wafer 60. The connection pads 34, 34a, 36 are located where the ends of each leg 26, 28 of each thermocouple 24 will be located to connect the ends of each leg 26, 28 together, and to couple each thermocouple 24 to the bond pads 42. The connection pads 34, 34a, 36 may be made of nearly any material which is electrically conductive, and which can adhere well to the wafer 60/passivation layer 62. In one embodiment, each contact pad 34, 34a, 36 are NiCr having a thickness of between about 1000 Å and about 4000 Å, although nearly any other acceptable material having nearly any desired thickness may be utilized. The connection pads 34, 34a, 36 may be formed by sputtering and patterned by wet etching, but may also be deposited/patterned by a variety of methods.

Figure 9:
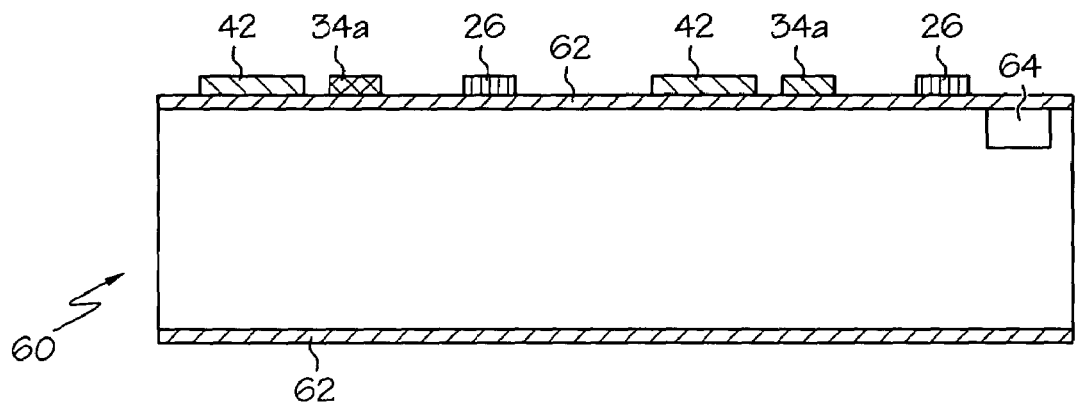
Figure 10:
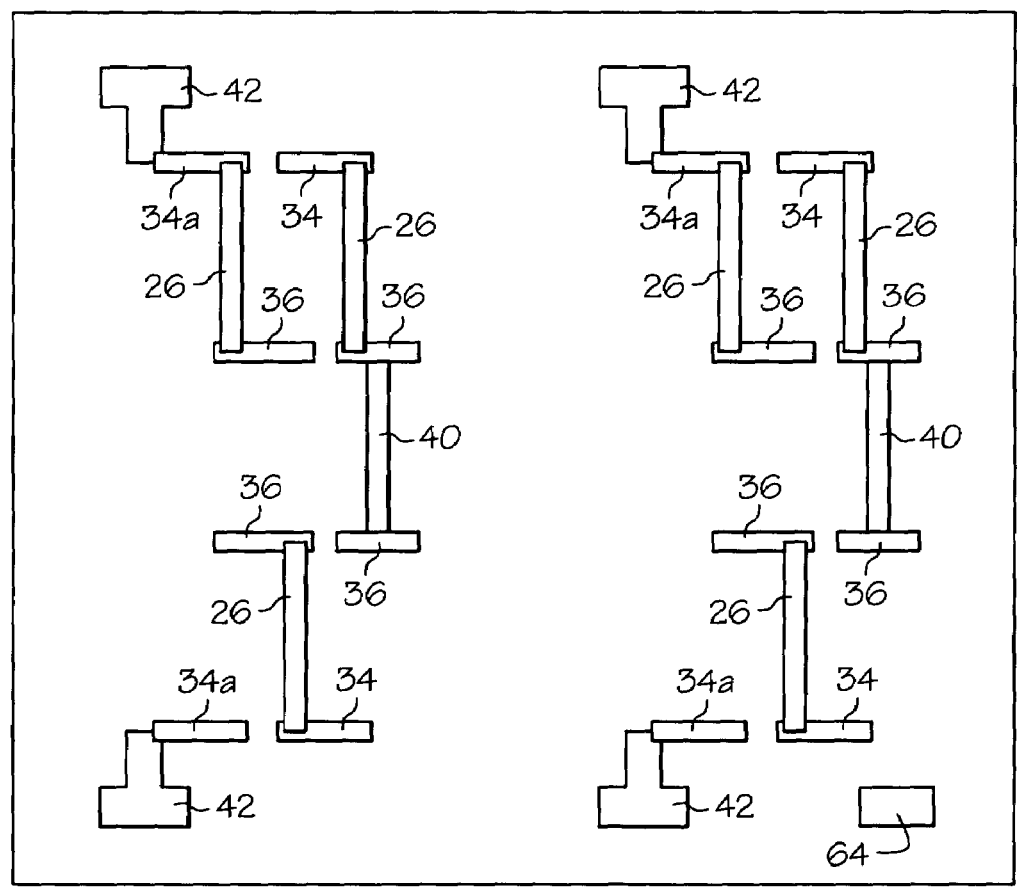
Figure 11:
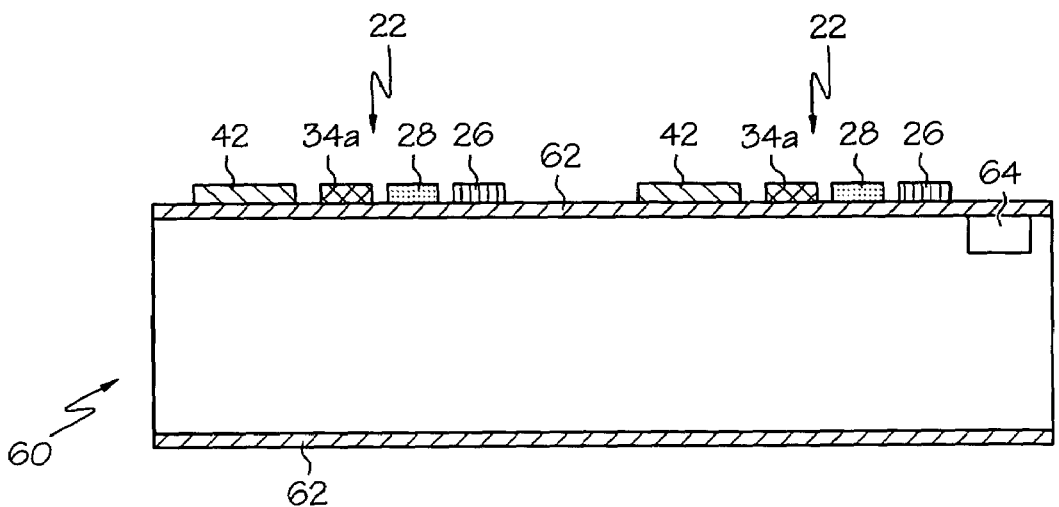
Figure 12:
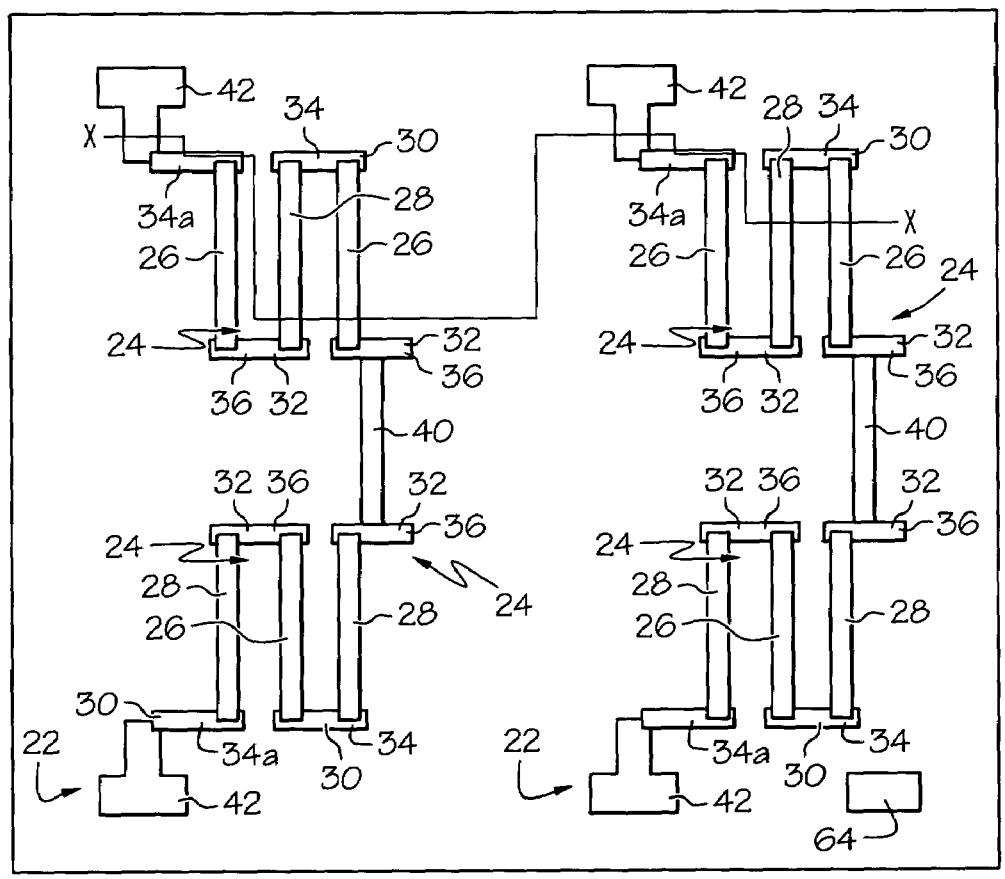

Next, as shown in FIGS. 9 and 10, the legs 26 of the first material are deposited on the wafer 60/passivation layer 62. In order to deposit the legs 26, a photoresist may be located on the wafer 60, such as by spin-coating, and the photoresist is then patterned in the shape of the legs of the first material 26 (i.e. to form a stencil). The first material 26 of each thermocouple 24 is then located on the wafer 60 (such as by sputtering), and the photoresist removed. The photoresist can be removed by a lift-off process (i.e. by a solvent, such as acetone) which results in the structure shown in FIGS. 9 and 10. In one embodiment, the first material 26 may be about 5000 Å thick n-type Bi—Sb—Te—Se material, and may have a thickness between about 1000 Å and about 20,000 Å.

In order to improve adhesion of the first material 26 to the wafer 60 (and more particularly, to the passivation layer 62), a relatively thin (i.e. between about 50 Å and about 200 Å) adhesion layer, such as titanium, may be located below the first material 26 (that is, located between the first material 26 and the passivation layer 62). Another adhesion layer, which can be made of the same (i.e. titanium) or different material may be located on top of the first material 26 in order to improve adhesion of the first material 26 (in a subsequent step) to the diaphragm 16.

Another layer of photoresist is then located on the wafer 60, and the photoresist is patterned in the shape (i.e. to form a stencil) of the second material 28 of each thermocouple 24. The second material 28 of each thermocouple 24 is then located on the wafer 60 in the same or similar manner as the first material 26, and the photoresist removed which results in the structure shown in FIGS. 11 and 12. In one embodiment, the second material 28 is about 5000 Å thick p-type Bi—Sb—Te layer. Similar to process described above for deposition of the first material 26, an adhesion layer (such as chromium having a thickness of between about 50 Å and about 200 Å) may be located below and above the second material 28 to aid in adhesion with the wafer 60/passivation layer 62 and diaphragm 16, respectively. At this point, both the hot 32 and cold 30 junctions are formed at the contact pads 36, 34.

The order of deposition of the inner 36 and outer 34 connection pads, transverse connection lines 40, end connection pads 36a, 34, output pads 42, and legs 26, 28 may be carried out in nearly any desired order. However, it may be desired that the deposition of the inner 36 and outer 34 connection pads, transverse connection lines 40, end connection pads 36a, 34, output pads 42, and legs 26, 28 occur prior to the deposition/formation of the diaphragm 16.

Due to the rapid deterioration of bismuth, antimony, tellurium, and selenium in most acids, liftoff (inverse masking) and ion-milling may be used to define the outer edges of the materials 26, 28 of the thermocouples 24 after the first 26 and second 28 materials are sputtered or otherwise deposited on the wafer 60. Ion milling provides good definition of the outer edges of the legs 26, 28 with higher aspect ratios. However, BCB and silicon nitride materials (i.e. the passivation layers 62) may not provide a good stop layer for ion milling. Liftoff patterning of the legs 26, 28 provides good definition and simplifies the patterning process, but may be effective only when there is sufficient spacing (i.e. about 5 or 10 microns or more) between each leg 26, 28 of the thermocouples 24. Wet etching, including NiCr etchant, Al etchant, buffered oxide etchant ("BOE"), and $H_2O_2$ may also be used to define/pattern the legs 26, 28.

The materials of the thermocouples 24 may include Bi—Sb—Te—Se alloys, polysilicon, chromium, PbTe, $Bi_2Te_3$, iron, Bi, doped silicon, FeNi, Bi, NiAl, Ni, Cr, NiCr, Sb, antimony, bismuth, Mn—Co—Ni—O materials, manganese oxide, cobalt oxide or nearly any thermoelectric material which has a sufficient Seebeck coefficient, including most metals. The materials of the thermocouples 24 are able to be made and patterned using standard CMOS fabrication techniques and methods (i.e. polysilicon etching techniques, chemical etching, plasma etches, etc.) The materials of the thermocouple 24 have a relatively large Seebeck coefficient which means that the materials 26, 28 will provide a relatively high voltage as a function of temperature difference to provide a detector 10 having a high responsivity.

The materials of the thermocouple 24 are desired to have a relatively high thermoelectric figure of merit z. The thermoelectric figure of merit z of a given material is equal to $S^2/\rho\lambda$ (where S represents the Seebeck coefficient of the material of interest; $\rho$ represents the electrical resistivity of the material of interest; and $\lambda$ represents the thermal conductivity of the material of interest). Detectivity D* of a detector is equal to $(A_{det}/NEP)^{1/2}$ (where $A_{det}$ is the optical area of the detector, and NEP is equal to $\Phi_{ms}*V_n/V_s$). A detector having a large relative detectivity D* is usually associated with thermoelectric materials having relatively high thermoelectric figures of merit z.

As noted above, the materials for the thermocouples 24 may be compounds in the $(Bi_{1-x}Sb_x)_2(Te_{1-y}Se_y)_3$ alloys. In one embodiment, the second material or second leg 28 of each thermocouple 24 are n-type (Bi—Sb—Te—Se) sputtered from a target of $Bi_{1.8}Sb_{0.2}Te_{2.7}Se_{0.3}$ which is doped with CuBr to a weight of about 1%. The actual composition of the deposited materials in this case may be as follows:

TABLE 1

Comparison of the composition of target and quantitative analysis of n-Bi—Sb—Te—Se film

| Element | Target Atom % | Deposited Atom % |
|---|---|---|
| Bi | 36.0 | 32.34 |
| Te | 54.0 | 54.99 |
| Se | 6.0 | 8.30 |

TABLE 1-continued

Comparison of the composition of target and quantitative analysis of n-Bi—Sb—Te—Se film

| Element | Target Atom % | Deposited Atom % |
|---------|---------------|------------------|
| Sb      | 4.0           | 4.37             |

The first material or first leg 26 of each thermocouple 24 may be p-type (Bi—Sb—Te) material that is sputtered from a target of $Bi_{0.4}Sb_{1.6}Te_{3.0}$. The actual composition of the deposited materials in this case may be as follows:

TABLE 2

Comparison of the composition of target and the quantitative analysis of p-Bi—Sb—Te film

| Element | Target Atom % | Deposited Atom % |
|---------|---------------|------------------|
| Bi      | 8.0           | 7.57             |
| Te      | 60.0          | 61.33            |
| Sb      | 32.0          | 31.1             |

The material of Table 1 may be deposited to a thickness of about 3945 Å and have a resistivity of about 0.0246 Ωcm (for an equivalent sheet resistance of about 62.5 Ω/square). The material of Table 2 may be deposited to a thickness of about 4450 Å and a resistivity of about 0.013 Ωcm (for an equivalent sheet resistance of about 29.5 Ω/square). In one embodiment, each leg 26, 28 of each thermocouple 24 has a length of about 1600 microns and a width of between about 136 and about 170 microns. The spacing between each of the legs 26, 28, or the pitch of each thermocouple 24, may be less than about 500 microns such as, for example, about 170 microns. The pitch may also be less than about 100 microns. The total resistance for a thermopile 22 made using these materials and dimensions may be between about 60 kΩ and about 80 kΩ. When viewing a 700 K blackbody source, a detector 10 with such a thermopile 22 may exhibit a response time of less than about 100 ms with zero frequency D* values of about $5.7 \times 10^7$ cmHz$^{1/2}$/W. The D* value can be increased by improving the electrical properties of the sensor materials.

Besides the Bi—Sb—Te—Se materials used for the thermocouples 24 described above, the thermocouples 24 may also be made of or include polysilicon. Thus, in this case the first material or first leg 26 of each thermocouple 24 is made of n-polysilicon that is doped by ion-implantation and patterned by a plasma dry etch. The second material or second leg 28 of each thermocouple 24 is made of p-polysilicon and is patterned in the same manner as the n-type polysilicon.

When the thermopile 22 is polysilicon based, a layer of thermal oxide may be deposited on the entire upper surface of the wafer 60 (and more particularly, the passivation layer 62) prior to depositing the first 26 and second 28 materials. The first material 26 of each thermocouple is then deposited and photopatterned, to form a shape similar to that of the first legs 26 of FIG. 10. The layer of polysilicon film is then deposited over the entire upper surface of the wafer 60 and thermal oxide prior to photopatterning. The polysilicon film may be deposited by any number of processes, including but not limited to LPCVD. The first material 26 is then doped to be n-type or p-type polysilicon, such as by ion implantation. The second material 28 each thermocouple 24 is then deposited and photopatterned in a similar manner, to form a shape similar to the legs of FIG. 12. The second material 28 is doped to be n-type or p-type polysilicon (whichever is opposite to the doping of the first material 26), such as by ion implantation. The legs 26, 28 of the thermocouples 24 are then patterned and etched to more clearly define the shapes of the legs 26, 28 and thermocouples 24.

Although polysilicon may have a relatively low value for its thermoelectric figure of merit, the polysilicon based thermopile infrared detector can be manufactured using standard CMOS fabrication techniques which can substantially reduce the cost for mass fabrication. Moreover, the polysilicon thermocouples 24 can be patterned into legs 26, 28 having a width and/or spacing of 2.0 µm or less. Therefore, the size of the detector 10 can be significantly reduced without a reduction in performance. Because polysilicon may have a relatively high temperature required for its deposition, the inner 36 and outer 34 connection pads, transverse connection lines 40, end connection pads 36a, 34 and output pads 42 (i.e. the "metallization") may be deposited after the legs 26, 28 are deposited so that the high temperatures required for polysilicon deposition does not damage the metallization.

Figure 13:
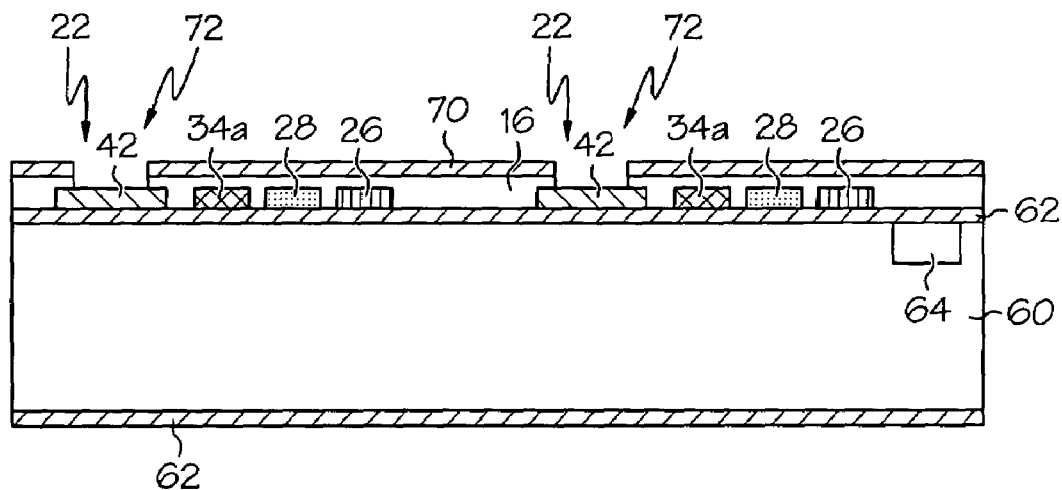

After the thermopile 22 and other metallization components are formed, the diaphragm 16 is formed over the thermopile 22 and the inner 36 and outer 34 connection pads, transverse connection lines 40, end connection pads 36a, 34a, output pads 42, and legs 26, 28, such as by spinning the diaphragm material 16 over the upper surface of the wafer 60 and then curing the diaphragm material (FIG. 13). In one embodiment, CYCLOTENE 3022 series BCB film may be spin-coated over the entire wafer 60 a thickness of from about 0.1 to about 5 or about 10 microns, in one case about 3 microns. The diaphragm 16 is then cured such as, for example, by exposing the diaphragm 16 to a temperature of about 200° C. for 3 hours.

In one embodiment, the diaphragm 16 is generally square in top view, having a side length of about 1000 microns. The diaphragm 16 may also be other shapes besides square, such as rectangular (having dimension of about 2750 micros by about 1000 microns), circular, etc., and may have a surface area of less than about 4 mm$^2$.

The diaphragm 16 has a relatively low thermal conductivity (i.e., in one case less than about 0.01 or less than about 0.005 Wcm$^{-1}$K$^{-1}$) so that the hot 32 and cold 30 junctions remain thermally isolated. The thermal conductivity of BCB (0.0029 Wcm$^{-1}$K$^{-1}$) is much lower than that of conventional silicon nitride (0.10–0.30 Wcm$^{-1}$K$^{-1}$). Thus, a BCB diaphragm 16 provides a significant reduction in thermal loss as compared to conventional silicon nitride. Furthermore, the diaphragm 16 is desired to be relatively thin, which decreases thermal conductivity. Thus the diaphragm 16 is desired to be made of a relatively robust material so that the diaphragm 16 can be relatively thin but resist breaking. BCB is relatively robust because its elastic compliance (i.e. the inverse of its Young's modulus) is about 80 times higher than that of silicon nitride.

The diaphragm 16 is made of a material which is generally resistant to chemical etchants, including but not limited to anisotropic etchants and isotropic etchants. BCB is resistant to a wide variety of wet chemical etchants, and retains its resistance at the elevated temperatures which may be utilized for anisotropic etching. The diaphragm 16 may, for example, not have any appreciable reduction in thickness after being exposed to a wet etchant after about an hour. The diaphragm 16 may have an essentially zero or negligible etch rate with respect to wet etchants, or in one embodiment have an etch rate of less than about 10 nanometers/minute, or in a preferred embodiment have an etch rate of less than about 1 nanometer/minute, or in a more preferred embodiment have an etch rate of less than about 0.1 nanometers/minute, or in a yet more preferred embodiment have an etch rate of less than about 0.01 nanometers/minute, or in a yet more preferred embodiment have an etch rate of less than about 0.001 nanometers/minute. The base 12 has a greater or significantly greater etch rate, such as, for example, in a preferred embodiment greater than about 0.1 micron/minute, or in a more preferred embodiment an etch rate greater than about 1 micron/minute, or in a yet more preferred embodiment an etch rate greater than about 3 microns/minute, or in a most preferred embodiment an etch rate greater than about 10 microns/minute to wet etchants of interest. Silicon has an etch rate of about 1.2 microns/minute to wet silicon etchants.

The diaphragm 16 is made of a photopatternable or a photodefinable material to aid in any machining or shaping of the diaphragm 16 which may be desired after its formation. For example, BCB can be either photo defined or patterned by plasma etching.

The diaphragm 16 is desired to have a relatively low curing temperature. Thus, when the diaphragm is cured such curing may be at temperatures below temperatures which may damage the IC components (i.e., the electronics 64). Thus, the diaphragm 16 may have a curing temperature less than about 450° C., or further preferably less than about 400° C., or further preferably less than about 250° C.

Processing temperature can provide barriers to combining MEMS processing (i.e. the formation of the thermopiles 22) with CMOS or IC processing (i.e. the formation of the electronics 64). Generally speaking, post-CMOS/IC processes should be carried out at a temperature below 450° C., which is the highest temperature aluminum can withstand. BCB has a curing temperature as low as about 200° C. which ensures that deposition/curing of the diaphragm 16 does not damage the electronics 64. Thus, the diaphragm material 16 is compatible with the inclusion of on-chip circuitry 64.

In order to enhance the adhesion of the diaphragm 16 to the thermocouples 24 as well as to any oxide and nitride (passivation) layers, the upper surface of the wafer 60 may be pretreated after the formation of the metallization components (i.e. after formation of the thermopile 22 and the inner 36 and outer 34 connection pads, transverse connection lines 40, end connection pads 36a, 34a, output pads 42, and legs 26, 28). A thin adhesion layer, such as Cr or Ti, can be located on the thermocouples 24, as outlined above. Alternately, or in addition, an industry-standard adhesion promoter, such as hexamethyldisilazane (HMDS), may be applied to the upper surface of the wafer 60 and/or the components located thereon prior to deposition of the diaphragm material 16. Further alternately, or further in addition, the upper surface may be treated with an oxygen plasma activation process (also known as an "ash" treatment) in a reactive ion etching ("RIE") machine. Any, each, or any combination of these steps or treatments may be utilize to improve adhesion of the diaphragm material 16. When the diaphragm material 16 is BCB, the BCB may be able adhere to the thermocouples 24, and the oxide/nitride layers 62, even after being subjected to a KOH etch (or tetramethyl ammonium hydroxide (TMAH) etch) at 90° C. for 4.5 hours as determined by a pull test.

Of course, as outlined above, various other materials besides BCB may be used to form the diaphragm 16, and an appropriate method for depositing such materials to the desired thickness may be carried out at this point. As a further example, parylene, or material from the parylene series (for example, parylene C, parylene D, parylene N and parylene HT) may be used as the diaphragm 16. Parylene is a relatively high purity and pin-hole-free polymer film which can be deposited by a vapor deposition polymerization ("VDP") process. Parylene provides various advantages such as low thermal conductivity, robustness, high resistant to caustic wet chemical etchants even at elevated temperature (e.g. 90° C.), and thermal stability up to 450° C.

Parylene is also able to be selectively etched by oxygen plasma while leaving little to no residuals. Furthermore, such an oxygen plasma etch will not attack the materials of the thermocouples 24 or the silicon nitride passivation layer 62 layer. Also, because parylene can be deposited by VDP, parylene does not require any curing after deposition and therefore provides faster manufacturing and possessing without damaging the electronics 62. The film thickness of parylene can be accurately controlled. In order to promote adhesion of the parylene layer 16 to the wafer 60, the upper surface of the wafer 60 and the components located thereon may be pretreated with an adhesion promoter, such as A-174 Silane prior to deposition of the parylene layer 16.

Figure 14:
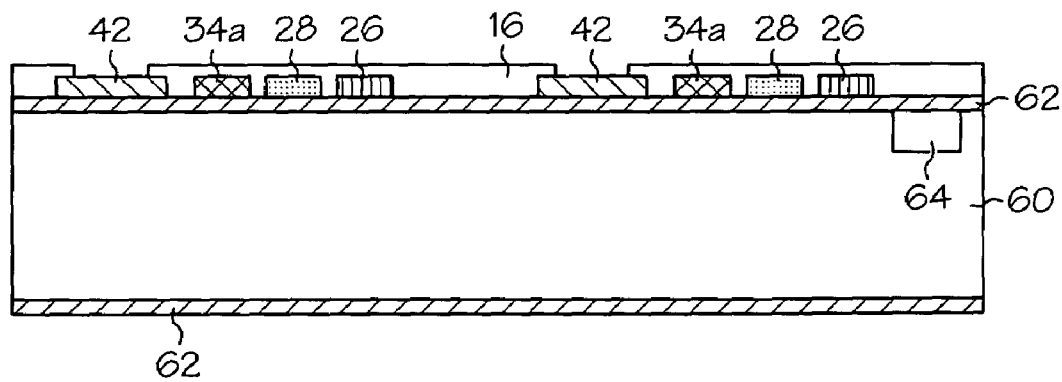

After the diaphragm 16 of desired material is formed, as shown in FIG. 13, a mask 70 is located over the diaphragm material 16. In one embodiment, the mask 70 is a 2000 Å thick aluminum film. The mask 70 is then patterned to form openings therein 72, with each opening being located above one of the bond pads 42. The portions of the diaphragm material 16 that are exposed by the openings 72 of the mask 70 are then removed or etched until the bond pads 42 are exposed (FIG. 14). In one embodiment the BCB film is etched by a $NF_3$—$O_2$ (or $CF_4$—$O_2$) reactive plasma dry etch at an etch rate of 0.55 microns/min stopping at the bond pads 42. The mask 70 is then removed, such as by a wet Al etchant.

Figure 15:
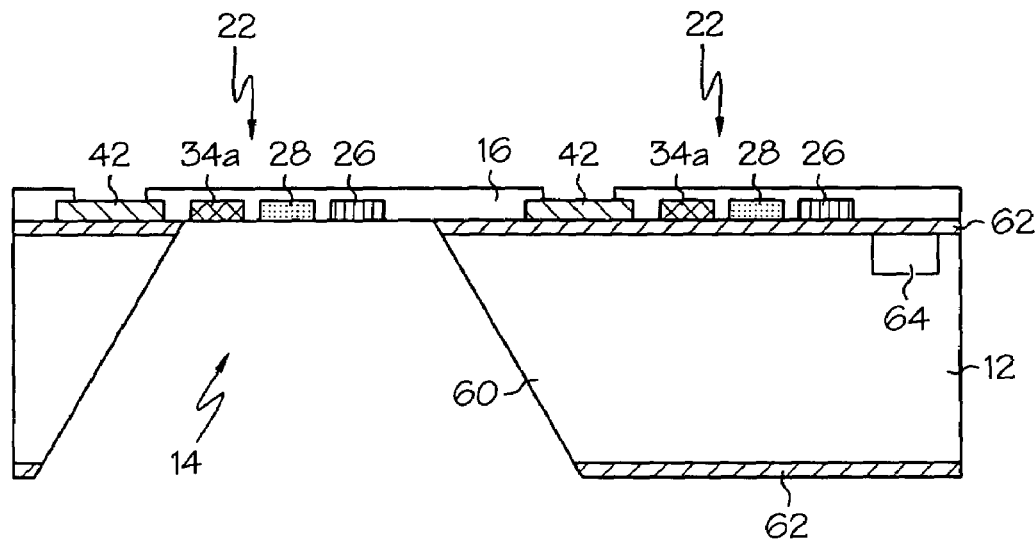

The diaphragm 16 is then released, such as by etching the bulk of the wafer 60 from the bottom side thereof. Thus, the passivation layer 62 on the bottom of the wafer 60 is first patterned (for example, by using a $CHF_3$—$O_2$ reactive plasma etch) to define the bottom edge of the central opening 14. The bulk of wafer 60 exposed by the opening of the lower passivation layer 62 is then removed to form the central opening 14 and expose the diaphragm 16 or the upper passivation layer 62 (or leaving a thin portion of the wafer 60 below the diaphragm 16). After the bulk of the wafer 60 is etched, if desired, the residual upper passivation layer 62 under the suspended portions of the diaphragm 16 may be removed, such as by dry etching, as shown in FIG. 15.

The central opening 14 may be centered on the wafer 60. However, the central opening 14 shown in FIG. 15 is offset to illustrate that the illustrated portions of the left-hand thermopile 22 are suspended over the central opening 14, and the illustrated portions of the right-hand thermopile 22 is located on, above or supported by the base 12 (see FIG. 12).

Various methods of etching the bulk of the wafer 60 may be utilized. In one embodiment, the wafer 60 is etched anisotropically by a potassium hydroxide solution (KOH) at 90° C. for 4.5 hours. The wafer 60 may then continue to be etched by KOH for about 1–2 hours at 40° C. until the upper passivation layer 60 is exposed. Other anisotropic etchants, such as tetramethyl ammonium hydroxide (TMAH), reactive ion etching (RIE) or deep reactive ion etching (DRIE) may be used, and isotropic etching methods may also be used. After the etching step, any wet etchants are removed by rinsing and spin-dry cleaning to dry the wafer 60.

The etching during this step should be monitored to ensure that the integrity of the diaphragm 16 is not compromised, because if etchants were to pass to the top side of the diaphragm 16 the etchants could damage the components on the top side (such as the thermocouples 24), undercut the wire bond pads 42 or delaminate the diaphragm 16. A sealed jig or fixture such as an O-ring or the like may be used to confine the etchant to the bottom or back side of the diaphragm 16.

Because the diaphragm 16 is resistant to a wide variety of caustic wet chemical etchants and is coated over the thermocouples 24 and electronics 64, the diaphragm 16 thereby seals and protect the thermocouple 24 and electronics 64 or other structures located on the wafer 60 during etching. Thus, the diaphragm 16 not only serves as a mechanical structure layer, but also serves as an etch-resistant protective layer for the on-wafer metallization circuitry. Since BCB or other materials of the diaphragm 16 may be a dielectric material, the material of the diaphragm 16 may remain on the surface of the wafer 60 to serve as a permanent passivation layer over the metallization (i.e. inner 36 and outer 34 connection pads, transverse connection lines 40, end connection pads 36a, 34a, output pads 42, and legs 26, 28) and CMOS/electronics structures 64.

If desired, the detector 10 is further processed at this point to thermally isolate each of the thermopiles 22 or thermocouples 24. For example, as shown in FIG. 1 a slit or opening 80 is formed or located on the diaphragm 16 between each thermopile 22. Although not shown in FIG. 1, slits or openings 80 in any of a variety of number and configuration may be added to enhance thermal isolation. In one case, slits 80 are located between each thermocouple 24 or between each leg 26, 28 of each thermocouple 24 to further enhance thermal isolation of the sensors reduce the cross talk between sensors. The slits 80 can be formed by any desired method such as, for example, a $CF_4$—$O_2$ reactive plasma etch or a $NF_3$—$O_2$ reactive plasma etch. The slits 80 can also be directly patterned by use of a photo definable BCB material.

Figure 16:
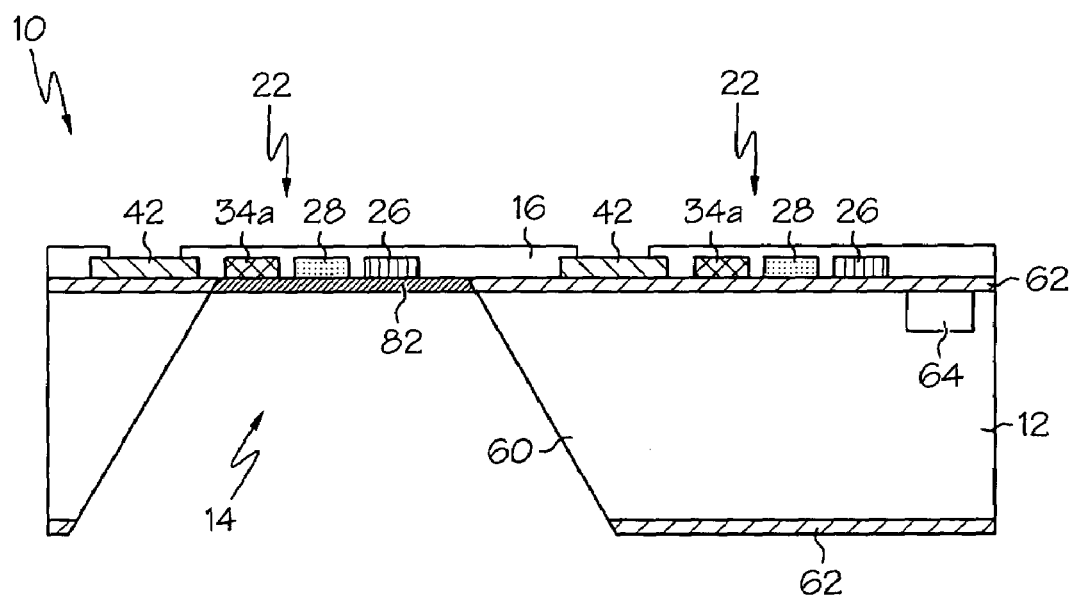

As shown in FIG. 16, an IR absorber layer 82, such as indium ink or black metal, is located or deposited on the back side of the diaphragm 16 by a shadow masking technique such that the IR absorber layer 82 can absorb IR radiation and transfer the absorbed energy/heat to the infrared sensitive component 20. The IR absorber extends over the hot junctions 32 of each of the thermocouples 24. The absorber layer 82 may be deposited by any desired method such as locating the absorber layer in liquid form and allowing the absorber material to dry, sputtering, or black metal deposition. The absorber layer 82 absorbs (and partially re-radiate) the IR radiation to be sensed to increase the sensitivity/accuracy of the detector 10. The absorber layer 82 may be applied prior to or after dicing.

Once the detector 10 is formed, the detector 10 is singulated or separated from the other surrounding detectors, or from the bulk of the wafer. The detector 10 may be singulated by dicing or other acceptable methods. In order to protect the diaphragm 16 during the dicing process, a protective tape, such as a transparent UV tape, may be placed on the top surface of the diaphragm 16 during the dicing process, and the tape can be removed after dicing The diced detector 10 of FIG. 16 may correspond to the completed detector 10 shown in FIGS. 1 and 1b.

The diced detector 10 is then ready for packaging, such as by placing the detector into the package 84 as shown in FIGS. 2 and 3. Packaging is an important step because the package provides a vacuum or low pressure (i.e. less than about 10 mTorr or less than about $10^{-5}$ Torr) environment to reduce gaseous convection which could cause an additional thermal loss of the detector 10. If desired, after the vacuum or low pressure is created in the package 84, the package is then back-filled with nitrogen to a desired pressure, such as, for example, about 2–3 torr. The package 84 includes a TO8 cap with a window 86 to allow IR radiation to pass therethrough to impinge upon the thermopiles. The window 86 is made of a material that is generally transparent to IR radiation, such as sapphire. The detector 10 is be bonded to the package 84 by using gold epoxy and baking the package and detector 10 about 145° C. for about 1 hour.

Use of BCB or other materials as outlined above as the diaphragm material 16 reduces thermal loss through the base 12 and also increases manufacturing yields. Materials such as BCB are relatively robust, and can survive the spin dry cleaning which may take place after the etching step of FIG. 15, and any dicing procedures. Yields for a detector formed or manufactured using the steps outlined above may be as high as 90% or 100%, as compared to 20% yields of similar detectors using silicon nitride diaphragms. The Young's modulus of BCB film is about 2.3±0.2 GPa, which is more than 100 times lower than that of silicon nitride which has a Young's modulus of about 320 GPa. Thus the diaphragm material 16 may have a Young's modulus of less than about 10 GPa.

Although the linear thermal expansion coefficient (5.2× $10^{-5}$/° C.) of BCB is larger than that of silicon nitride (8×$10^{-7}$/° C.), any internal stress of the BCB film caused by thermal effects are relatively low due to its small Young's modulus. For example, the residual stress of BCB may be between about 2 and about 28 MPa in tension. Thus, the diaphragm 16 has a relatively large elastic compliance that enhances the mechanical strength of the detector 10 during bulk micromachining processes, thereby increasing production yields.

Due to the relatively low thermal conductance of the diaphragm 16, any thermal conductance through the diaphragm 16 to the base 12 may be negligible compared to the thermal conductance through the thermocouples 24. Furthermore, BCB and other diaphragm materials may be inexpensive, have a high chemical resistance, and be easy to process (i.e. by patterning). The diaphragm material 16 provides relatively low metal migration to ensure the stability of the thermopiles 22 located thereon.

As shown in FIG. 17, the diaphragm material 16 and processing described herein may also be utilized to form an ultrasonic sensor 90. The manufacturing process for the sensor 90 may be identical or nearly identical to that described above and shown in FIGS. 4–16, but instead of forming a thermopile 22 on the wafer 60 at FIGS. 7–12, piezoelectric or piezoresistive materials (generically illustrated at 92), such as PZT (lead zirconate titanate) or heavily doped silicon, is located or formed on the wafer 60. Metallization (i.e. the connection pads 34, wire bond pads 42, etc.) may be formed after or prior to formation of the piezoelectric or piezoresistive materials 92. The diaphragm material 16, such as BCB, is then deposited over the piezoelectric or piezoresistive material 92. The diaphragm 16 is then released, as shown in FIG. 15.

Once the diaphragm 16 is released, the structure as shown in FIG. 17 results. The ultrasonic sensor 90 has a piezoelectric or piezoresistive element 92 located thereon with a pair of output pads 42. The piezoelectric or piezoresistive element 92 may have a piezoresistivity or gauge factor of, in a preferred embodiment greater than about 1, or in a more preferred embodiment greater than about 10, or in a most preferred embodiment greater than about 100. In operation, an instrument, computer, controller, processor or other external device is coupled to the output pads 42. The detector 90 is then placed in the presence of ultrasonic waves or energy which will cause the diaphragm 16 to flex or vibrate. The materials of the diaphragm 16 discussed herein, such as BCB, are relatively flexible due to the relatively low value for the Young's modulus.

Flexing of the diaphragm 16 will cause a voltage or change in resistance to arise across the piezoelectric or piezoresistive element 92. The instrument, computer, controller, processor or other external device then detects the voltage or change in resistance across the piezoelectric or piezoresistive element 92, and then determines the amount and/or concentration of ultrasonic energy to which the detector 90 is exposed by, for example, referring to empirical and/or theoretical look-up tables and/or by performing other calculations upon the measured voltage. The ultrasonic sensor 90 may of course include a wide variety of shapes and arrangement of piezoelectric or piezoresistive sensors 92, and the single piezoelectric or piezoresistive sensor 92 included in FIG. 17 is provided as a simple illustrative example.

It should be understood that a single detector may include any combination of an infrared detector component, piezoelectric element or piezoresistive element. Thus, when the term "infrared sensitive component or piezoelectric or piezoresistive element" is used herein, such term may include: 1) only an infrared sensitive component, or 2) only a piezoelectric element, or 3) only a piezoresistive element, or 4) both an infrared sensitive component and a piezoelectric element, or 5) both an infrared sensitive component and a piezoresistive element, or 6) both a piezoresistive element and a piezoelectric element, or 7) an infrared sensitive component and a piezoelectric element and a piezoresistive element.

Having described the invention in detail and by reference to the preferred embodiments, it will be apparent that modifications and variations thereof are possible without departing from the scope of the invention.

What is claimed is:

1. A detector comprising:
    a base having a recess formed therein;
    a diaphragm generally extending across said recess; and
    an infrared sensitive component or a piezoelectric or piezoresistive element supported by said diaphragm, said diaphragm including a benzocyclobutene material which is generally resistant to liquid chemical etchants and which has a thermal conductivity of less than about 0.005 $Wcm^{-1}K^{-1}$, wherein said diaphragm has a thickness of between about 0.1 and about 10 microns.

2. The detector of claim 1 wherein said diaphragm material has an etch rate of less than about 0.01 nanometers/minute when exposed to liquid chemical etchants.

3. The detector of claim 1 wherein said base has an etch rate of greater than about 1 micron/minute to a liquid chemical etchant, and wherein said diaphragm material has an etch rate of less than about 0.01 nanometers/minute to said liquid chemical etchant.

4. The detector of claim 1 wherein said diaphragm material is generally resistant to anisotropic chemical etchants.

5. The detector of claim 1 wherein said diaphragm material is generally resistant to KOH or TMAH liquid chemical etchants.

6. The detector of claim 1 wherein said diaphragm material is photodefinable or photopatternable.

7. The detector of claim 6 wherein said diaphragm material hardens, cures, softens, or becomes removable upon exposure to electromagnetic radiation.

8. The detector of claim 7 wherein said electromagnetic radiation is ultraviolet radiation.

9. The detector of claim 1 wherein said diaphragm has a thickness of less than about 5 microns.

10. The detector of claim 1 wherein said diaphragm has a surface area of less than about 4 $mm^2$.

11. The detector of claim 1 wherein said base has a thermal conductivity at least about 10 times greater than the thermal conductivity of said diaphragm material.

12. The detector of claim 1 wherein said diaphragm material has a Young's modulus of less than about 10 GPa.

13. The detector of claim 1 wherein at least part of said diaphragm is located above said recess, and at least part of said diaphragm is not located above said recess.

14. The detector of claim 13 wherein said detector includes said infrared sensitive component and part of said infrared sensitive component is supported by said part of said diaphragm located above said recess, and wherein part of said infrared sensitive component is supported by said part of said diaphragm not located above said recess.

15. The detector of claim 1 wherein said infrared sensitive component includes at least one property that varies when said infrared sensitive component is exposed to infrared radiation, and wherein said variation in said property can be sensed by instrumentation.

16. The detector of claim 1 wherein said infrared sensitive component generates an electrical signal when said infrared sensitive component is exposed to infrared radiation, and wherein said electrical signal can be sensed by instrumentation.

17. The detector of claim 1 wherein said infrared sensitive component includes a thermopile.

18. The detector of claim 17 wherein the pitch of said thermopile is less than about 500 microns.

19. The detector of claim 17 wherein said thermopile includes a plurality of thermocouples, each thermocouple including a pair of legs having Seebeck coefficients of opposite value.

20. The detector of claim 19 wherein each thermocouple includes a hot junction and a cold junction, and wherein each hot junction is located above said recess and each cold junction is not located above said recess.

21. The detector of claim 1 further including at least one output pad electrically coupled to said infrared sensitive component or piezoelectric or piezoresistive element such that said infrared sensitive component or piezoelectric or piezoresistive element is operatively connectable to an external device via said output pad.

22. The detector of claim 21 wherein said output pad is located on, above, or supported by said base.

23. The detector of claim 1 wherein said infrared sensitive component includes Bi—Sb—Te—Se alloys.

24. The detector of claim 1 wherein said infrared sensitive component includes polysilicon.

25. The detector of claim 1 further including an infrared radiation absorbing material located on at least one side of said diaphragm.

26. The detector of claim 1 wherein said base has a thermal conductivity of greater than about 0.1 $Wcm^{-1}K^{-1}$.

27. The detector of claim 1 wherein said base has a thickness of between about 50 and about 1000 microns.

28. The detector of claim 1 further including a diaphragm adhesion layer located between said diaphragm and said infrared sensitive component or piezoelectric or piezoresistive element.

29. The detector of claim 28 wherein said diaphragm adhesion layer is titanium or chromium.

30. The detector of claim 1 wherein said detector is an infrared radiation detector and does not include a piezoelectric or piezoresistive element located on, above, or supported by said diaphragm.

31. The detector of claim 1 wherein said detector is an ultrasonic detector and does not include an infrared sensitive component located on, above or supported by said diaphragm.

32. The detector of claim 1 wherein piezoelectric or piezoresistive element has a gauge factor of greater than about 1.

33. The detector of claim 1 wherein said piezoelectric or piezoresistive element is made of or includes semiconductor materials.

34. The detector of claim 1 wherein said infrared sensitive component or piezoelectric or piezoresistive element is indirectly supported by said diaphragm such that at least one material is located between said infrared sensitive component or piezoelectric or piezoresistive element and said diaphragm.

35. The detector of claim 34 wherein said at least one material is an adhesive layer to improve the adhesion of said infrared sensitive component or piezoelectric or piezoresistive element to said diaphragm.

36. The detector of claim 34 wherein said at least one material is a passivation layer.

37. The detector of claim 1 wherein said diaphragm material has a curing temperature of less than about 450 °C.

38. A method for forming a detector comprising the steps of:
providing a base;
forming or locating an infrared sensitive thermocouple component on said base;
forming or locating a benzocyclobutene diaphragm on or over said infrared sensitive thermocouple component, said diaphragm having a pair of opposed major sides, wherein said infrared sensitive thermocouple component is entirely located on only a single side thereof; and
removing at least part of said base to form a recess such that said recess is located below at least part of said infrared sensitive thermocouple component, wherein said diaphragm has a thickness of between about 0.1 and about 10 microns.

39. The method of claim 38 wherein said removing step includes removing substantially all of said base located below at least part of said diaphragm in a direction extending generally perpendicular to said diaphragm.

40. The method of claim 38 wherein said diaphragm material is generally resistant to liquid chemical etchants.

41. The method of claim 40 wherein said diaphragm material has an etch rate of less than about 0.01 nanometers/minute when exposed to liquid chemical etchants.

42. The method of claim 40 wherein said base has an etch rate of greater than about 1 micron/minute to a liquid chemical etchant, and wherein said diaphragm material has an etch rate of less than about 0.01 nanometers/minute to said liquid chemical etchant.

43. The method of claim 38 wherein said base has a thermal conductivity of greater than about 0.005 $Wcm^{-1}K^{-1}$.

44. The method of claim 38 wherein said diaphragm material is photodefinable or photopatternable.

45. The method of claim 38 wherein said second forming or locating step includes forming or locating said diaphragm such that said diaphragm has a thickness of less than about 5 microns.

46. The method of claim 38 removing step includes removing at least part of said base to form said recess such that at least part of said diaphragm is located above said recess and at least part of said diaphragm is not located above said recess.

47. The method of claim 38 wherein said first forming or locating step includes forming or locating a plurality of thermocouples on said base, each thermocouple including a pair of legs having Seebeck coefficients of opposite value.

48. The method of claim 38 wherein said infrared sensitive thermocouple component includes Bi—Sb—Te—Se alloys.

49. The method of claim 38 wherein said infrared sensitive thermocouple component includes polysilicon.

50. The method of claim 38 further including the step of forming or locating at least one output pad on said base such that said output pad is electrically coupled to said infrared sensitive thermocouple component such that said infrared sensitive thermocouple component is operatively connectable to an external device via said output pad.

51. The method of claim 50 further including the step of etching said diaphragm to expose said at least one output pad.

52. The method of claim 38 further including the step of depositing an infrared radiation absorbing material on at least one side of said diaphragm.

53. The method of claim 38 wherein said base has a thickness of between about 50 and about 1000 microns.

54. The method of claim 38 further including the step of, prior to said first forming or locating step, forming or locating a wafer adhesion layer on said base, and wherein said infrared sensitive thermocouple component is located on, above or supported by said wafer adhesion layer.

55. The method of claim 54 wherein said wafer adhesion layer is titanium or chromium.

56. The method of claim 38 further including the step of, prior to said second forming or depositing step, forming or locating a diaphragm adhesion layer on said infrared sensitive thermocouple component.

57. The method of claim 38 wherein said diaphragm material has a curing temperature of less than about 450 °C.

58. The method of claim 38 wherein said base includes a passivation layer located thereon, and wherein said removing step exposes said passivation layer.

59. The method of claim 58 further comprising the step of, after said removing step, removing said exposed passivation layer.

60. The method of claim 38 wherein at least one surface of said infrared sensitive component or piezoelectric or piezoresistive element is generally exposed or is covered only by a material that is generally transparent to infrared radiation such that infrared radiation emitted by an external source in a direction generally perpendicular to said diaphragm can be detected by said infrared sensitive component or piezoelectric or piezoresistive element.

61. The method of claim 38 wherein said thermocouple includes a pair of legs having Seebeck coefficients of opposite value.

* * * * *